UNITED STATES PATENT OFFICE.

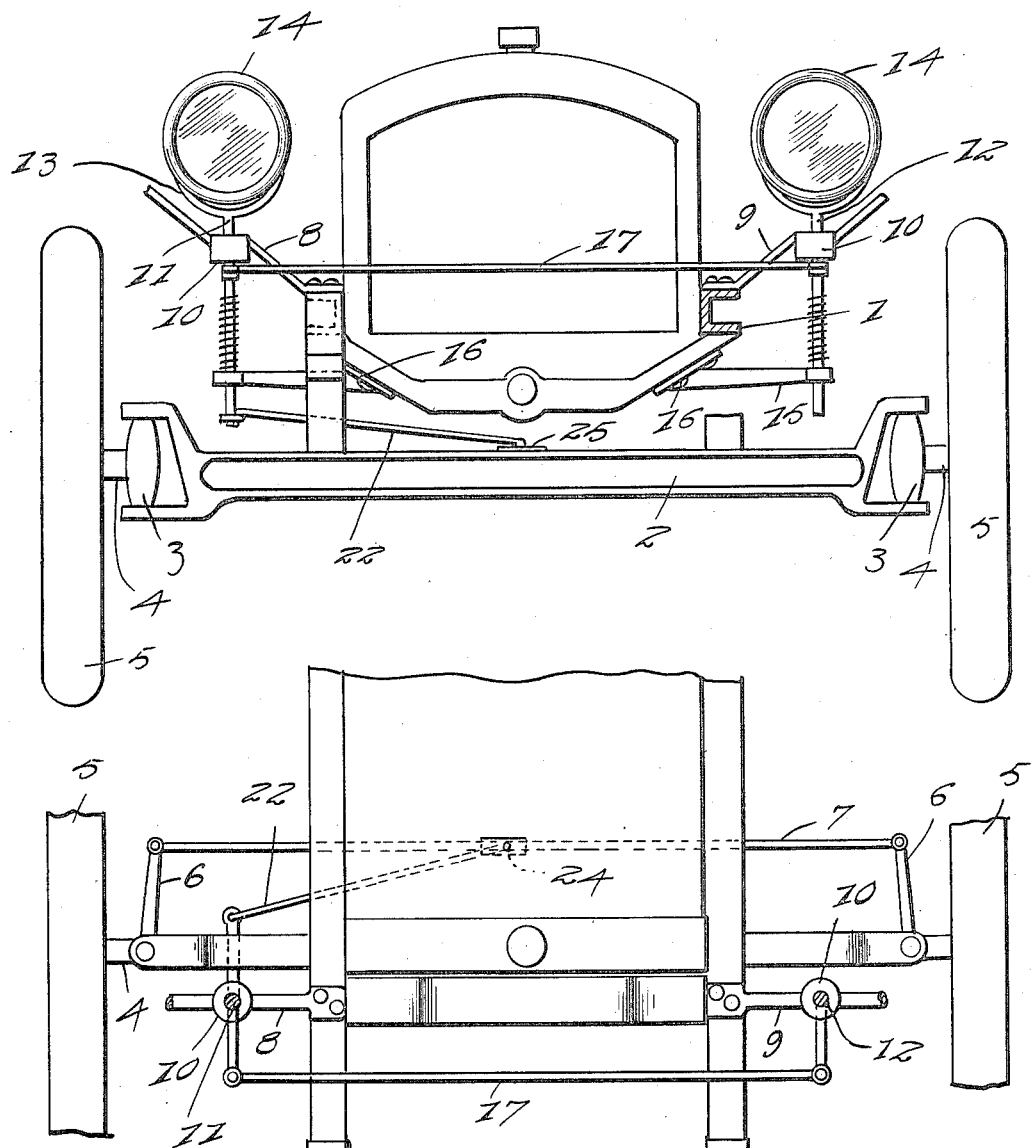

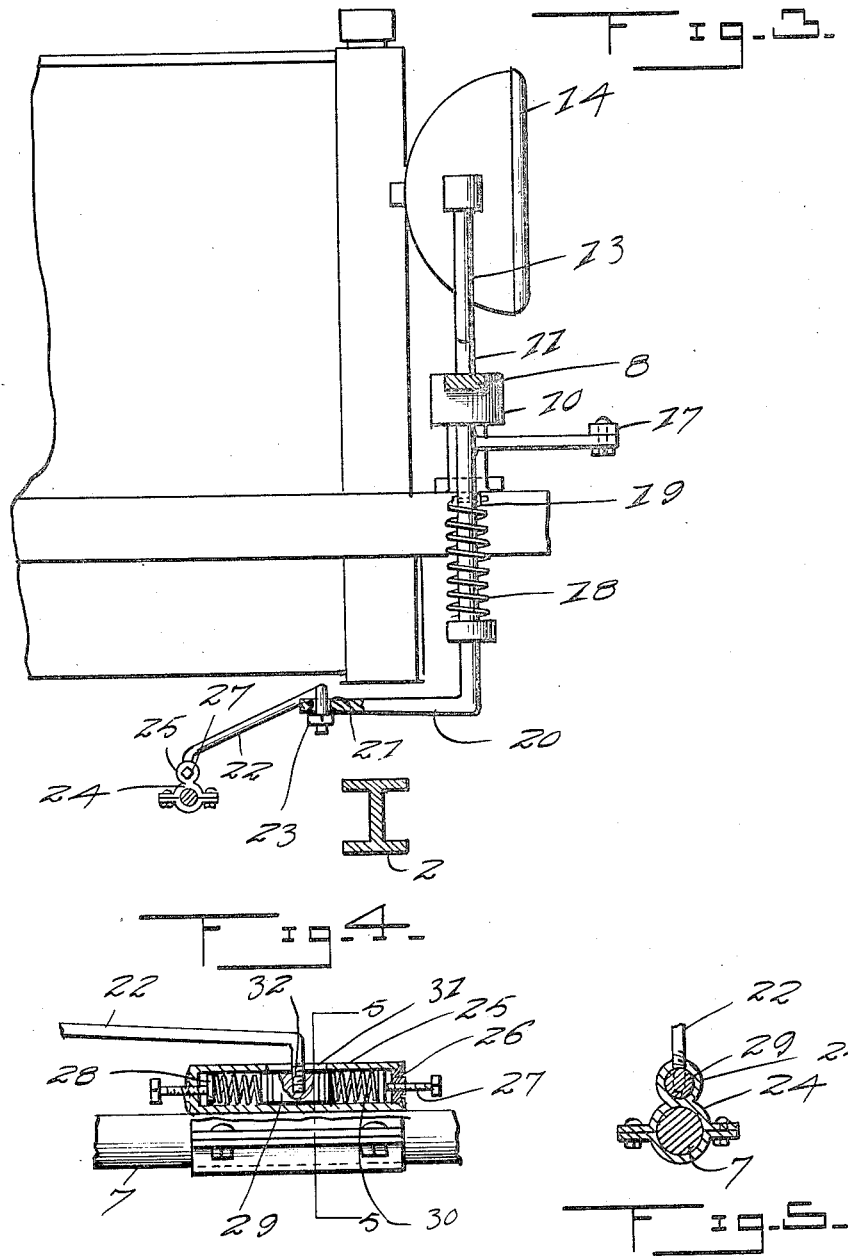

ROBERT O. FROST, OF MINDEN, AND ROBERT A. LEVIA, OF KINMOUNT, ONTARIO, CANADA.

DIRIGIBLE AUTOMOBILE-LIGHT.

1,206,690.  Specification of Letters Patent.  Patented Nov. 28, 1916.

Application filed July 25, 1916. Serial No. 111,269.

*To all whom it may concern:*

Be it known that we, ROBERT O. FROST and ROBERT A. LEVIA, subjects of the King of Great Britain, residing at Minden and Kinmount, respectively, in the Province of Ontario and Dominion of Canada, have invented certain new and useful Improvements in Dirigible Automobile-Lights; and we do hereby declare the following to be a full, clear, and exact description of the invention, such as will enable others skilled in the art to which it appertains to make and use the same.

This invention relates to dirigible automobile headlights and has for its primary object the provision of means for turning the headlights in a corresponding direction with the turning of the front wheels of the automobile, to illuminate sharp curves in the roadway, obviating the waste of light when the headlights remain stationary and direct their rays of light to one side of the roadway when turning out of a straight course.

Another object of this invention is to provide a pair of lamp standards, having headlights thereon and connected to the steering gear of the automobile to turn the headlights upon turning of the front wheels from a straight course, to cause the headlights to direct their rays of light in the path of the front wheels.

A further object of this invention is to provide means for connecting the lamp standards to the steering gear of the automobile in such a manner that the steering gear is capable of slight movement before the lamp standards will be turned, to obviate short turning movement of the lamp standards caused by the front wheels passing over uneven ground.

A still further object of this invention is to provide a dirigible automobile headlight of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which:—

Figure 1 is a front elevation of dirigible automobile headlights, constructed in accordance with our invention, Fig. 2 is a top plan view of the same with the headlights removed, Fig. 3 is a vertical sectional view, illustrating the manner of connecting one of the lamp standards to the steering gear of the automobile, Fig. 4 is a detail sectional view illustrating the means of allowing a slight movement of the steering gear in relation to the lamp standards, and Fig. 5 is a detail sectional view taken on the line 5—5 of Fig. 4.

Referring in detail to the drawings, the numeral 1 indicates a chassis of an automobile and 2 the front axle upon which the chassis 1 is mounted. The axle 2 has the usual steering knuckles 3 mounted on each end, on which are formed the spindles 4 for journaling the front wheels 5. Rearwardly extending arms 6 are formed on the steering knuckles 3 and are connected together by a connecting rod 7, which is usually connected to the steering gear of the automobile (not shown).

Secured to the forward end of the chassis 1 and upon each side thereof are fender supporting brackets 8 and 9 which have formed intermediate their ends bearings 10, in which are journaled lamp standards 11 and 12. The lamp standards have their upper ends forked as illustrated at 13 to receive headlights 14, which may be of any desired construction. The lamp standards 11 and 12 extend downwardly through the bearings 10 and have their lower ends received by brackets 15 which are secured to the chassis 1 at a point below the fender supporting brackets 8 and 9 as illustrated at 16. The lamp standards 11 and 12 are connected by a rod 17 for causing the lamp standards to turn simultaneously.

Coil springs 18 are mounted upon the lamp standards 11 and 12 and have one of their ends secured to the brackets 15 and their other ends secured to the lamp standards by nuts 19 for causing the headlights 14 to normally maintain a position as illustrated in Fig. 1 so that the rays of light will be directed in front of the automobile.

The lower end of the lamp standard 11 is bent rearwardly to form a crank arm 20 which is apertured as illustrated at 21 to receive one end of an operating rod 22. The end of the operating rod 22 is bent at right angles and depends through the opening 21 of the crank arm 20 and has threaded thereon a nut 23 for retaining the right angled bent end within the opening 21 of the crank arm.

A clamp 24 consisting of a pair of sections is bolted or otherwise secured to the connecting rod 7 and has mounted upon the upper section a substantially cylindrical housing 25 which has its ends closed by end walls 26 that are provided with screw-threaded apertures to receive adjusting bolts 27. The adjusting bolts 27 have formed on their inner ends heads 28 which are located within the housing 25. A block 29 is slidably mounted within the housing and has positioned upon each end thereof coil springs 30 which bear against the heads 28 of the adjusting bolts 27. The free end of the operating rod 22 is bent as illustrated at 32 and screw-threaded to be received within a screw-threaded opening within the block 29. The housing 25 is provided with an elongated slot 31 to allow the end 32 of the operating rod 22 to pass through the housing into the block 29. By turning the front wheels of the automobile in either direction, the connecting rod 7 will be moved to cause the operating rod 22 to be moved which in turn turns the headlights 14 in a corresponding direction with the front wheels to direct the rays of light from the headlights in the path of the front wheels. The block 29 slidably mounted within the housing 25 and having the coil springs 30 positioned upon each end provides means whereby the connecting rod 7 is capable of slight movement before the operating rod 22 is moved, as it is necessary to compress the coil springs before the operating rod 22 will be moved to turn the headlights, obviating short turning movement of the headlights caused by the front wheels passing over uneven ground.

While we have shown and described the preferred embodiment of our invention, it will be understood that minor changes in construction, combination and arrangement of parts may be made without departing from the spirit and scope of the invention as claimed.

Having thus described our invention, what we claim is:—

In combination, an automobile including a chassis and a connecting rod of a steering gear thereof, of a pair of lamp standards journaled to the chassis, means for connecting the lamp standards together, headlights carried by the lamp standards, a clamp secured to the connecting rod, a substantially cylindrical housing mounted upon the clamp, adjusting bolts carried by each end of the housing, a block slidably mounted within the housing, coil springs interposed between the ends of the block and the ends of the adjusting bolts, said housing having an elongated slot in the top thereof, an operating rod detachably secured to the block and to one of the lamp standards for turning the headlights.

In testimony whereof we affix our signatures in presence of two witnesses.

ROBERT O. FROST.
ROBERT A. LEVIA.

Witnesses:
W. M. FROST,
RALPH BYRNE.